US008375835B2

(12) United States Patent
Thacker

(10) Patent No.: US 8,375,835 B2
(45) Date of Patent: Feb. 19, 2013

(54) GUIDE BAR TRACK EXTENSION METHOD AND APPARATUS

(76) Inventor: Thomas M. Thacker, Newberg, OR (US)

( * ) Notice: Subject to any disclaimer, the term of this patent is extended or adjusted under 35 U.S.C. 154(b) by 710 days.

(21) Appl. No.: 12/459,404

(22) Filed: Jun. 30, 2009

(65) Prior Publication Data

US 2010/0000387 A1 Jan. 7, 2010

Related U.S. Application Data

(60) Provisional application No. 61/077,757, filed on Jul. 2, 2008.

(51) Int. Cl.
*B23D 45/06* (2006.01)

(52) U.S. Cl. ....... 83/446; 83/477.2; 83/435.11; 144/287

(58) Field of Classification Search ................ 83/477.2, 83/446, 435.11; 144/287
See application file for complete search history.

(56) References Cited

U.S. PATENT DOCUMENTS

| | | | | |
|---|---|---|---|---|
| 1,789,125 | A * | 1/1931 | Wilderson | 83/438 |
| 3,368,266 | A | 2/1968 | Schultz | |
| 3,377,685 | A | 4/1968 | Carlstedt | |
| 3,456,323 | A | 7/1969 | Huyvaert et al. | |
| 3,460,226 | A | 8/1969 | Hildebrand | |
| 3,469,299 | A | 9/1969 | Rogers | |
| 3,508,313 | A | 4/1970 | O'Hanlon | |
| 3,518,743 | A | 7/1970 | Muller | |
| 3,525,140 | A | 8/1970 | Cachon et al. | |
| 3,540,110 | A | 11/1970 | Schwartz | |
| 3,579,785 | A | 5/1971 | Hellborg | |
| 4,157,819 | A | 6/1979 | Meyer | |
| 4,406,200 | A * | 9/1983 | Kerr | 83/473 |
| 4,477,064 | A | 10/1984 | DiGiulio | |
| 4,598,453 | A | 7/1986 | Wills | |
| 4,697,799 | A | 10/1987 | Wickham et al. | |
| 4,718,164 | A | 1/1988 | Hokanson et al. | |
| 4,780,040 | A | 10/1988 | Petersen | |
| 4,787,505 | A | 11/1988 | Tweedy | |
| 4,805,888 | A | 2/1989 | Bishop | |
| 5,198,067 | A | 3/1993 | Sumi et al. | |
| 5,228,374 | A * | 7/1993 | Santeramo, Sr. | 83/438 |
| 5,261,304 | A * | 11/1993 | Stollenwerk et al. | 83/410.8 |
| 5,280,893 | A | 1/1994 | Sitensson | |
| 5,310,299 | A | 5/1994 | Bernstein | |
| 5,346,058 | A | 9/1994 | Santandrea et al. | |
| 5,538,231 | A | 7/1996 | Baldwin et al. | |
| 5,573,230 | A | 11/1996 | Lambertini | |
| 5,685,413 | A | 11/1997 | McGough | |
| 5,735,219 | A | 4/1998 | Kirker et al. | |
| 5,743,706 | A | 4/1998 | Happ et al. | |
| 5,857,507 | A * | 1/1999 | Puzio et al. | 144/287 |
| 5,984,291 | A | 11/1999 | Iwata et al. | |
| 5,992,835 | A | 11/1999 | Gallegos et al. | |
| 6,237,457 | B1 * | 5/2001 | Taylor | 83/435.15 |
| 6,332,529 | B1 | 12/2001 | Kaishita | |
| 6,668,696 | B1 * | 12/2003 | Krohmer et al. | 83/477.2 |
| 6,694,851 | B2 | 2/2004 | Erisoty | |
| RE38,622 | E | 10/2004 | Fujimori | |
| 7,497,239 | B2 * | 3/2009 | Smith | 144/286.5 |

* cited by examiner

*Primary Examiner* — Kenneth E. Peterson
(74) *Attorney, Agent, or Firm* — Portland Intellectual Property, LLC

(57) ABSTRACT

A guide bar track extension method and apparatus. A machining table has a table surface terminating at a side thereof, the surface defining a table perimeter, and a slot for a guide bar. A guide bar extension mechanism is cooperatively adapted with the table for detachably mounting to the side of the table. The guide bar extension mechanism includes an adjustment mechanism providing for lateral adjustment of the guide bar extension mechanism relative to the axis. The adjustment mechanism includes two opposed guiding members adapted to contact the guide bar outside the table perimeter.

5 Claims, 3 Drawing Sheets

GUIDE BAR TRACK EXTENSION METHOD AND APPARATUS

RELATED APPLICATION

This application claims the benefit of U.S. Ser. No. 61/077,757, filed Jul. 2, 2008, which is incorporated by reference herein in its entirety.

FIELD OF THE INVENTION

The present invention relates to guide bars, such as those used on a table-saw, and more particularly relates to a method and apparatus for extending the tracks thereof.

BACKGROUND

Machining apparatus often incorporate what are referred to as "guide bars" which are used to support structures that guide the workpiece relative to the cutting tool or bit. In a table-saw, for example, the guide bar is commonly used to support a fence, or a miter gage. The guide bars are typically of rectangular cross-section, and slide in correspondingly shaped slots that are machined or cast into the table of the apparatus.

Table-saws typically have tables that are only about 27" square. It is therefore difficult to use such table-saws to saw standard 4×8 sheets of material (e.g., plywood), and so it is often necessary to provide additional tables, adjacent the table-saw, to support the overhanging material. Even with this additional support, however, there remains a problem associated with, at least, standard 4×8 sheets of plywood, which is that they are not sufficiently square (i.e., the edges are not close enough to being perpendicular) and the use of, e.g., a fence or miter gage is needed to rectify this.

In response to this problem, table-saw guide bars have been used to support what are referred to as "sleds" that provide a larger table area that can be translated. However, the guide bars remain supported only within the footprint provided by the table, which is insufficient to provide for accurate control of the movement of the sled over the relatively large excursions required. The present invention addresses the need for a simple and inexpensive solution to this problem.

SUMMARY

A guide bar track extension method and apparatus is disclosed. An apparatus according to the invention includes a machining table, a guide bar, and a guide bar extension mechanism. The machining table has a table surface terminating at a side thereof, the surface defining a table perimeter. The table has at least one elongate slot defining an elongate central axis, the slot extending to said side so as to provide an aperture therethrough. The guide bar is adapted to be received by the slot for axial translation therein, and passed through the aperture. The table and the guide bar extension mechanism are cooperatively adapted for detachably mounting the guide bar extension mechanism to the side of the table. The guide bar extension mechanism includes an adjustment mechanism providing for lateral adjustment of the guide bar extension mechanism relative to the axis. The adjustment mechanism includes two opposed guiding members adapted to contact the guide bar outside the table perimeter.

Preferably, the opposed guiding members are rolling members.

A disclosed method includes providing a machining table having a table surface terminating at a side thereof, the surface defining a table perimeter, the table having at least one elongate slot defining an elongate central axis, and the slot extending to the side so as to provide an aperture therethrough. The method includes receiving within the slot a guide bar, and providing a guide bar extension mechanism for detachable mounting to the side, the guide bar extension mechanism including two opposed guiding members, the guiding members being spaced apart from the side. The method further includes axially translating the guide bar within the slot so that an end of the guide bar passes through the aperture, sufficiently past the table perimeter so as to make contact with the guiding members.

Preferably, the guiding members include rotating members, and the contact results in rotating said rotating members.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Figure 1:
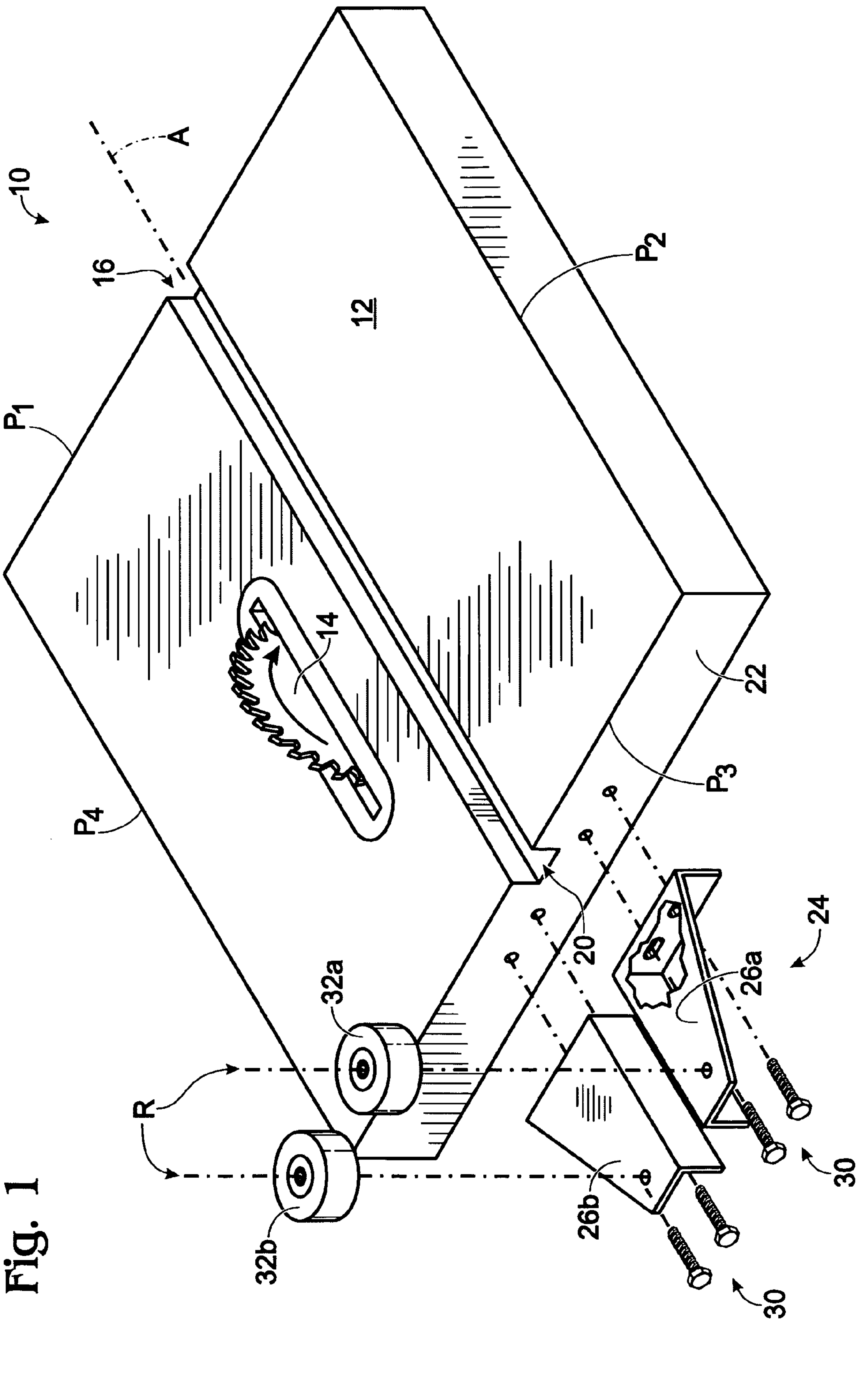
FIG. 1 is an exploded pictorial view of a table-saw and a guide bar track extension apparatus for detachably mounting thereto, according to the present invention.
Figure 2:
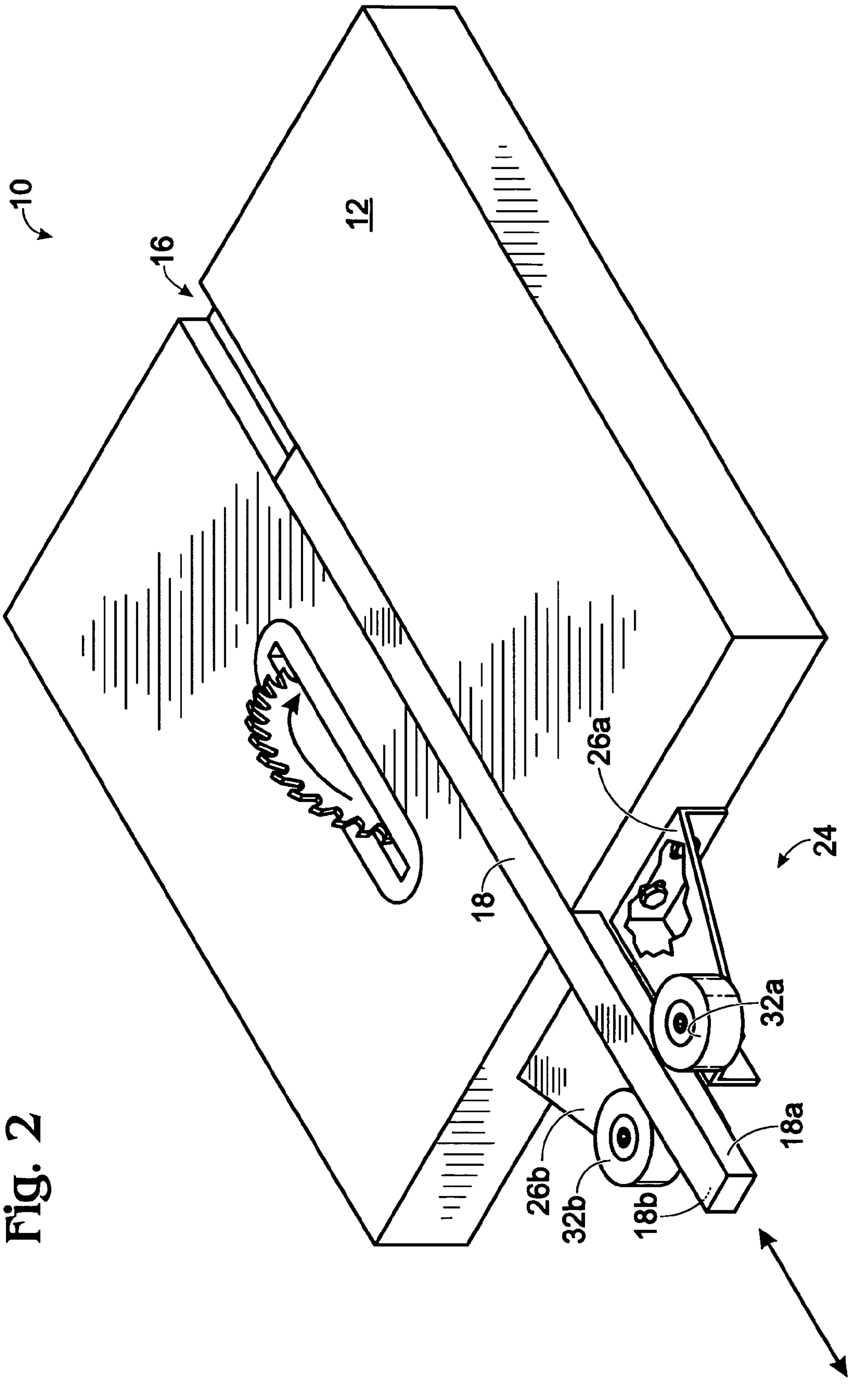
FIG. 2 is a pictorial view of the table-saw of FIG. 1 and a guide bar received within a guide bar slot thereof, with the guide bar track extension apparatus of FIG. 1 shown mounted to the table saw, according to the present invention.

FIGS. 1 and 2 show a machining table 12, which is part of a machining apparatus 10 which in the preferred context of the invention is a table-saw. The machining apparatus 10 includes a machining element 14, which in the preferred context of a table-saw is a saw-blade. While the invention will be described herein for use with a machining apparatus 10 that is a table-saw, it will be understood that invention may be used with any other type of machining apparatus.

The table 12 includes at least one slot 16 adapted for slidably receiving therein a guide bar 18 (FIG. 2). The slot defines an aperture 20 in a side 22 of the table 12. The table defines a perimeter "P," which is further defined in this example by the four edges $P_1$, $P_2$, $P_3$, and $P_4$ of the (square) table 12.

The perimeter P is the footprint of the table 12. As shown in FIG. 2, the guide bar 18 may slide in the slot 16 in the direction of the arrows, and particularly may slide through the aperture 20, past the perimeter P.

According to the invention, a guide bar track extension mechanism 24 is provided as a convenient after-market attachment to the table 12. The mechanism 24 is therefore preferably detachably mounted, more preferably bolted, to the table 12, or the apparatus generally. Preferably, the mechanism 24 is bolted either to the side 22 of the table as shown, or to the bottom of the table (not shown) or to an intermediating member (also not shown) attached to the machining apparatus. Persons of ordinary skill will readily recognize a number of options for such mounting that are consistent with the principles of the invention. The Figures show the use of bolts 30 for mounting the extension mechanism 24 into holes that are, preferably, drilled into the table 12 and tapped by a user or installer of the apparatus.

The extension mechanism 24 apparatus includes two support members 26*a*, 26*b*, that are preferably not joined together so that their positions relative to one another can be individually adjusted. Particularly, it is recognized by the present inventor as being important for accurate tracking of the guide bar to contact the guide bar on opposite sides 18*a*, 18*b* (the latter not visible in FIG. 2) thereof. To provide this functionality, the support members 26 include horizontal slots through which the bolts 30 pass, the slots allowing for independent lateral adjustment of the positions of the support members 26 relative to the central axis "A" (FIG. 1) of the slot 16.

The aforementioned contact is made specifically between the sides 18*a*, 18*b* of the guide bar and corresponding guiding members 32*a*, 32*b* that are supported, respectively, by the support members 26*a*, 26*b*. The guiding members may be fixed to the support members, but it is recognized as being highly preferable to provide them in the form of rolling or rotating members, and further, so that their axes of rotation "R" (FIG. 1) are perpendicular to the surface of the table 12.

While it is preferable to provide both support members 26 in the form of rolling members, much of the advantage provided by the use of rotating members can be achieved if only one of the support members is adapted for rotation. Preferably, the rotating members are standard ball or roller bearings.

Figure 3:
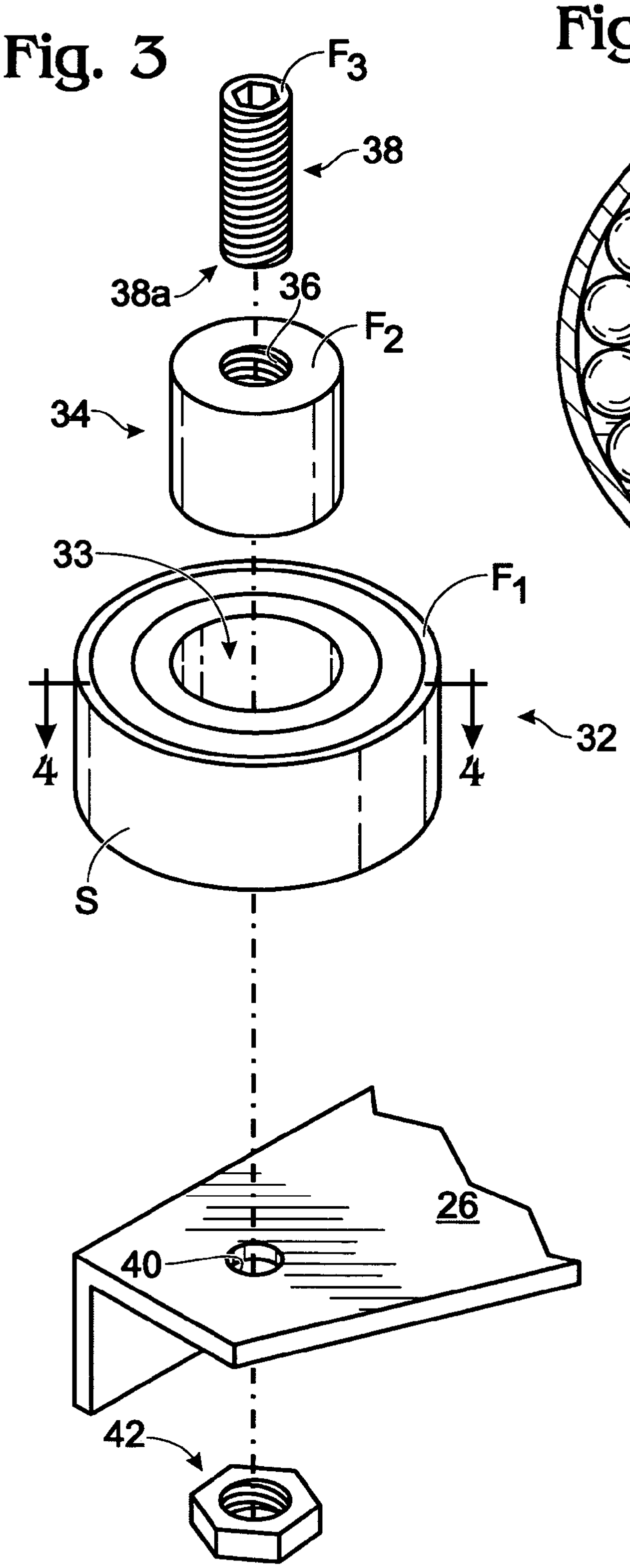
FIG. 3 is an exploded view of guiding member, in the form of a rotating member, mounted to a support member according to the present invention.

FIG. 3 shows a guiding member 32 in the form of a rotating member attached to a support member 26 according to the invention. It is preferable that a top face "$F_1$" of the guiding member 32 be flush with (or below) the top surface of the table 12, so that the guiding member does not interfere with the sled as the sled is being passed thereover. An exemplary mounting for the guiding member 32 that accomplishes this objective includes a sleeve 34 that is adapted to make an interference fit within an aperture 33 of the guiding member. The external surface of the sleeve 34 and the aperture 33 are shown as being cylindrical, but this is not necessary, since the only requirement is that these parts mate.

The sleeve 34 is pressed into the guiding member 32 so that a top face "$F_2$" of the sleeve is flush with (or below) the face $F_1$.

The sleeve 34 includes a threaded hole 36 for receiving a set-screw 38. The set-screw 38 is threaded into the hole 36 so that a top face "$F_3$" of the set-screw is flush with (or below) the face $F_2$.

The sets-screw is passed through the sleeve 34, and therefore the guiding member 32, and extends through a hole 40 in the support member 26. A nut 42 is threaded onto an end 38*a* of the set-screw to secure the set-screw in place.

Figure 4:
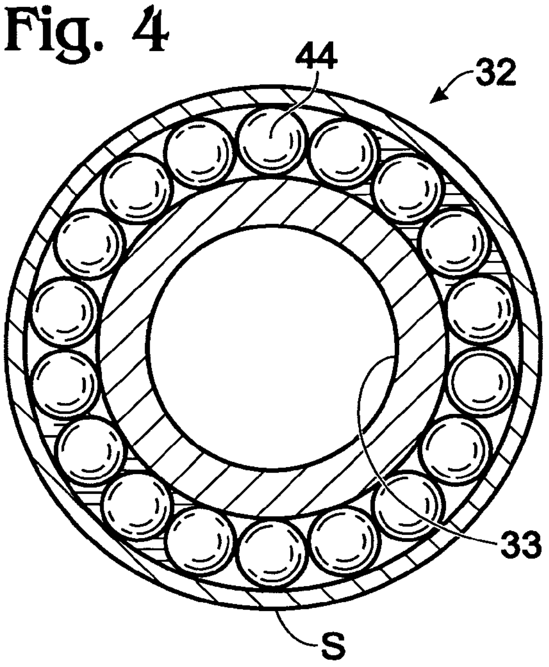
FIG. 4 is a plan view of a ball bearing for use as, or in, a guiding member according to the present invention.

FIG. 4 shows a plan view of the guiding member 32 in the preferred form of a ball bearing. The ball bearing includes a number of balls 44 in a race defining a cylindrical outer surface "S" that makes the contact with the guide bar 18 discussed above.

It is to be understood that, while a specific guide bar track extension method and apparatus has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A machining apparatus having a machining tool and a table surface terminating at a side thereof, said surface defining a table perimeter, said table having at least one elongate slot defining an elongate central axis, said slot extending to said side so as to provide an aperture therethrough;

a guide bar adapted to be received by said slot for axial translation therein, and passed through said aperture; and a guide bar extension mechanism including two opposing adjustable members, each adjustable member being detachably mounted to said side of said table on opposing sides of said aperture so as to be laterally adjustable toward or away from the other opposing adjustment member, each of said opposing adjustment members having a rolling member mounted thereon so as to contact opposing sides of said guide bar outside said table perimeter.

2. The apparatus of claim 1, wherein each said rolling member is adapted for rotation about an axis that is substantially perpendicular to said table surface.

3. The apparatus of claim 1, wherein said opposing adjustable members have respective elongate slots and respective threaded fasteners for mounting said support members to said side.

4. The apparatus of claim 3, wherein said table further comprises two tapped holes in said side, for receiving the respective said threaded fasteners.

5. A method for using the apparatus defined in claim 1, comprising providing the apparatus of claim 1 and receiving said guide bar within said slot, and axially translating said guide bar within said slot so that an end of said guide bar passes through said aperture so as to make contact with said rolling members outside said table perimeter.

* * * * *